United States Patent [19]

Aratani

[11] Patent Number: 5,127,932
[45] Date of Patent: Jul. 7, 1992

[54] METHOD FOR TOUGHENING GLASS SHEET

[75] Inventor: Shin-ichi Aratani, Mie, Japan

[73] Assignee: Central Glass Company, Limited, Ube, Japan

[21] Appl. No.: 707,911

[22] Filed: Jan. 30, 1991

[30] Foreign Application Priority Data

Jan. 31, 1990 [JP] Japan ................................. 2-20622

[51] Int. Cl.$^5$ ............................................. C03B 27/00
[52] U.S. Cl. ........................................ 65/114; 65/115
[58] Field of Search ................... 65/115, 114, 104, 351

[56] References Cited

U.S. PATENT DOCUMENTS

| | | | |
|---|---|---|---|
| 3,174,840 | 3/1965 | Long | 65/115 |
| 3,776,709 | 12/1973 | Melling | 65/114 |
| 4,178,414 | 12/1979 | Greenhalgh . | |
| 4,182,619 | 1/1980 | Greenhalgh . | |
| 4,198,463 | 4/1980 | Greenhalgh . | |
| 4,735,646 | 4/1988 | Aratani et al. | 65/114 |
| 4,888,038 | 12/1989 | Herrington et al. | 65/114 |
| 4,913,720 | 4/1990 | Gardon et al. | 65/114 |

FOREIGN PATENT DOCUMENTS

| | | | |
|---|---|---|---|
| 108331 | 6/1985 | Japan | 65/115 |
| 1-38058 | 8/1989 | Japan . | |

*Primary Examiner*—Joye L. Woodard
*Attorney, Agent, or Firm*—Fleit, Jacobson, Cohn, Price, Holman & Stern

[57] ABSTRACT

The invention relates to a method of toughening a glass sheet by heating it to a temperature above the strain point and quenching the heat glass sheet while it is advancing horizontally by blowing cooling gas jets onto each face of the glass sheet from an array of nozzles. In advance of such quenching, the heated glass is preliminarily cooled to some extent so as to cool the glass sheet at a relatively high rate in substantially parallel stripe-like regions, which make an angle greater than 45° and not greater than 135° with the direction of advance of the glass sheet, than in other regions. As a result, relatively high toughening occurs in the stripe-like regions. Preferably the preliminary cooling is made only in a central area of the glass sheet. The preliminary cooling has the effect of compensating a toughening pattern attributed to the unidirectional movement of the glass sheet under quenching, so that the toughened glass sheet is satisfactory in the manner of fragmentation. By this method even glass sheets thinner than 3.5 mm can be toughened so as to fully meet the fracture requirements for toughened glass sheets to be used as automobile side or rear windows.

9 Claims, 1 Drawing Sheet ured glass sheets.

METHOD FOR TOUGHENING GLASS SHEET

BACKGROUND OF THE INVENTION

This invention relates to a method of toughening a glass sheet by heating the glass sheet to a temperature above the strain point of the glass and cooling the heated glass sheet while the glass sheet is transferred horizontally in a lying state, the method being particularly suitable for application to a relatively thin glass sheet, viz. glass sheet thinner than about 4 mm, for use in an automobile side or rear window.

In the recent automobiles there is a trend toward enlargement of the window areas while reducing the thickness of the window glasses. Accordingly it has become more and more important to efficiently and reliably toughen relatively thin and relatively wide glass sheets.

There are official regulations specifying the manner of fracture of toughened glass sheets for use as side and rear windows of automobiles. For example, both the British standard and the E.E.C. standard specify the minimum and maximum numbers of glass particles in any 5 cm×5 cm square traced on the fractured glass sheet further requires that the fractured glass sheet should not contain elongated particles longer than 6 cm (such elongated particles are called "splines").

However, it is not easy to toughen glass sheets thinner than about 4 mm by a conventional air quenching method so as to fully meet the official regulations, because in the case of a thin glass sheet it is difficult to create and maintain a sufficient gradient of temperature in the thickness of the glass sheet during the quenching process. To overcome the difficulty it is prevailing to differentially quench a glass sheet so as to distribute in the glass sheet relatively highly toughened regions and lesser toughened regions in a suitable pattern. In practice, to enhance productivity it is often that the quenching is performed while glass sheets in a horizontally lying state are successively transferred through a furnace and a cooling station. In such a case the difficulty of desirably toughening a thin glass sheet augments because the distribution of differentially toughened regions in the glass sheet is affected by the unidirectional movement of the glass sheet.

For example, U.S. Pat. Nos. 4,178,414 and 4,182,619 relate to a method of toughening a relatively thin glass sheet while it is advanced horizontally through a quenching station by directing cool air jets to each face of the heated glass sheet from a lattice-like array of nozzles and show to pulse the air jets at a repetition frequency related to the speed of advance of the glass sheet and also to slightly incline rows of the nozzles to the direction of advance of the glass sheet. U.S. Pat. No. 4,198,463 relates to an analogous method and shows to toughen a relatively thin glass sheet of a trapezoidal shape so as to relatively highly toughen a strip-shaped region near the longer of the parallel sides of the glass sheet. JP No. 1-38058 also relates to an analogous method and shows to toughen a relatively thin glass sheet so as to relatively highly toughen a plurality of stripe-like regions which are elongate in the direction of advance of the glass sheet.

The methods of the above patents will have some advantages, respectively. However, in my view any of the hitherto proposed quenching methods is not yet fully satisfactory for desirably quenching a relatively thin glass sheet while it is advancing horizontally, and particularly for reliably preventing the appearance of splines in the fractured glass sheets.

SUMMARY OF THE INVENTION

It is an object of the present invention to provide an improved method for toughening a glass sheet, which may be thinner than about 4 mm and may be for use as an automobile side or rear window glass, by heating the glass sheet and then quenching the heated glass sheet while the glass sheet is advancing horizontally, which method is capable of toughening the glass sheet so as to fully meet official regulations for toughened glass sheets to be used in automobile windows and reliably preventing the appearance of splines in the fractured glass sheet.

The present invention provides a method of toughening a glass sheet, comprising the steps of (a) heating the glass sheet to a temperature above the softening point of the glass, (b) preliminarily cooling the heated glass sheet from at least one face of the glass sheet while advancing the glass sheet horizontally so as to cool the glass sheet at a relatively high rate in a plurality of substantially parallel stripe-like regions, which make an angle greater than 45 degrees and not greater than 135 degrees with the direction of advance of the glass sheet, than in other regions, and (c) after step (b) quenching the heated glass sheet while it is advancing horizontally by blowing cooling gas jets onto each face of the glass sheet from an array of nozzles. The preliminary cooling is made such that on the face, or each of the faces, from which the glass sheet is cooled the heat transfer coefficient becomes in the range from 10 to 80 kcal/m$^2$·h·°C. in the stripe-like regions, and the quenching in the step (c) is made such that on each face of the glass sheet the heat transfer coefficient reaches at least 150 kcal/m$^2$·h·°C.

The principal feature of the method according to the invention resides in the preliminary cooling in the above stated step (b). The quenching in the step (c) is analogous to a conventional quenching operation for toughening a glass sheet. When a heated glass sheet is quenched while it is advancing unidirectionally by directing cooling gas jets to the glass sheet from an array of nozzles it is almost inevitable that relatively high toughening occurs in stripe-like elongate regions which are parallel to the direction of advance of the glass sheet. Such a toughening pattern is liable to become a cause of appearance of splines when the toughened glass sheet fractures. By the preliminary cooling according to the invention relatively high toughening occurs also in stripe-like regions which make a considerable angle with the direction of advance of the glass sheet. Therefore, in the toughened glass sheet an oblique toughening pattern is superposed on the toughening pattern parallel to the direction of advance of the glass sheet so that there are changes or alternations of the direction of the principal stress as will be described hereinafter more in detail. For this reason, when the toughened glass fractures there is little probability of the appearance of impermissible splines.

Preferably the preliminary cooling according to the invention is made only in a central area of the glass sheet because when a toughened glass sheet fractures splines are liable to appear mostly in a central area.

Glass sheets of various thicknesses can be well toughened by the method according to the invention, and this method is particularly suitable for application to glass sheets thinner than about 3.5 mm. By this method, even glass sheets not thicker than 3.5 mm can be toughened so as to fully and reliably meet the current regulations on toughened glass sheets for use in automobile side or rear windows. By this invention the appearance of splines in the fractured toughened glass sheets can surely be prevented, and the difference between the maximum number and the minimum number of glass particles can be reduced. Either a flat glass sheet or a curved glass sheet can be toughened by this method, and in performing this method it is unnecessary to considerably change the speed of horizontal advance of the glass sheets.

DESCRIPTION OF THE PREFERRED EMBODIMENTS

Figure 1:
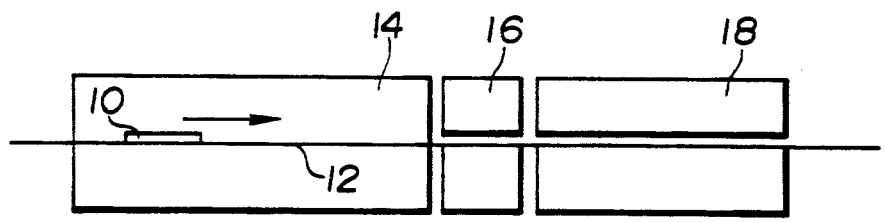
FIG. 1 is a diagram showing an outline of a glass sheet toughening apparatus for use in the present invention.

Referring to FIG. 1, a glass sheet 10 to be toughened by a method according to the invention is laid horizontally on a supporting and transferring means 12 such as conveyor rollers or a gas bed, and the glass sheet 10 is horizontally transferred through a heating furnace 14, a preliminary cooling station 16 and an ultimate cooling station 18. The speed of the advance of the glass sheet 10 is variable according to the thickness of the glass sheet. For example, the speed is from about 10 to 18 m/min. In the furnace 14 the glass sheet 10 is uniformly heated to a temperature above the strain point of the glass and below the softening temperature, e.g. to a temperature between 600° and 700° C.

The heated glass sheet 10 is preliminarily cooled to some extent in the station 16. Preferably the preliminary cooling is made from the both faces of the glass sheet, though this is not an indispensable requirement. The preliminary cooling is performed such that the glass sheet is cooled at a relatively high rate in substantially parallel stripe-like regions, which are oblique or perpendicular to the direction of advance of the glass sheet, than in the remaining regions. The preliminary cooling may be made over substantially the entire area of the glass sheet, but it is preferable to effect the preliminary cooling only in a limited, central area of the glass sheet as will be described hereinafter. Preferably the preliminary cooling is performed by using cool air jets spouted from nozzles arranged in parallel rows, but it is also possible to use a press mechanism with platens formed with elongate projections in a stiped pattern. In the case of using air jets it is optional to pulse the air jets or oscillate the nozzles. It is favorable to make the cooling nozzles or the press mechanism movable parallel to the horizontally advancing glass sheet.

After the preliminary cooling the glass sheet, which is still hot and advancing horizontally, is immediately subjected to ultimate cooling in the station 18. The ultimate cooling is made from the both faces of the glass sheet by directing cool air jets onto each face of the glass sheet from a lattice-like or staggered lattice-like array of nozzles which are spaced apart in rows transversely of the direction of advance of the glass sheet with rows spaced apart in the direction of the advance. The pressure of the cool air may range from about 700 mmH$_2$O to about 2500 mmH$_2$O according to the thickness of the glass sheet. That is, the ultimate cooling station 18 is provided with a conventional air cooling mechanism. The ultimate cooling is made such that the heat transfer coefficient on each of the glass sheet reaches at least 150 kcal/m$^2$·h·°C.

Figure 2:
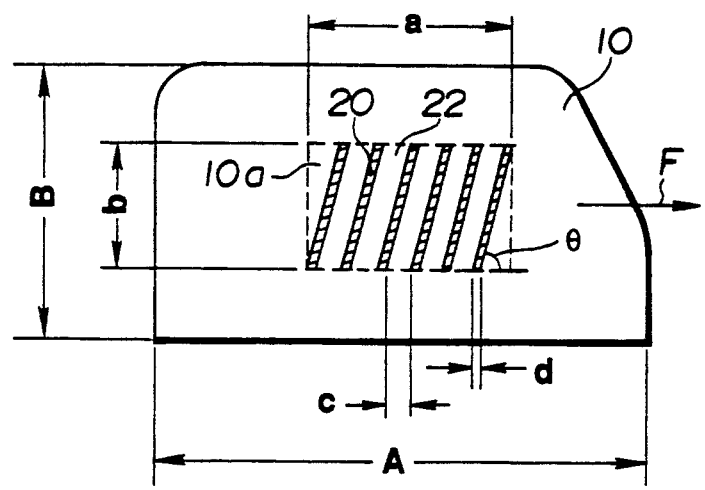
FIG. 2 is a plan view of a glass sheet and explanatorily shows stripe-like regions where the glass sheet is relatively efficiently cooled by a preliminary cooling operation according to the invention.

With respect to the preliminary cooling in the station 16, FIG. 2 explanatory shows an example of the stripe-like regions 20 where the glass sheet 10 is cooled at relatively high efficiency and hence relatively highly stressed than in regions 22 between the stripe-like regions 20. The stripe-like regions 20 make an angle θ which is greater than 45° and not greater than 135° with the direction of advance of the glass sheet 10 indicated by the arrow F. The preliminary cooling is performed such that the heat transfer coefficient on each cooled face of the glass sheet becomes about 10 to about 80 kcal/m$^2$·h·°C. in the stripe-like regions 20 and smaller in the regions 22. The preliminary cooling is performed only for a short period of time: usually for about 0.2 sec to about 1 sec in the case of using air jets and for about 0.5 sec to about 2 sec in the case of using a press mechanism. Since the glass sheet has a sufficiently high temperature at the start of the preliminary cooling the glass sheet is considerably stressed particularly in the stripe-like regions 20 even though the preliminary cooling operation achieves only a small degree of cooling. The stripe-like regions 20 are designed such that the the distance c between the two adjacent stripes 20 is in the range from about 20 mm to about 50 mm, and preferably from about 25 to 35 mm, and such that the width d of each stripe-like region 20 is in the range from about 5 mm to about 10 mm, and preferably from about 6 to 7 mm.

As mentioned hereinbefore, it is preferable to effect the preliminary cooling only in a limited central area 10a of the glass sheet 10 containing the geometrical center of the glass sheet preferably such that the center of the central area 10a approximately coincides with the center of the glass sheet 10. A glass sheet for use as an automobile side or rear window usually has a generally quadrilateral shape such as a roughly rectangular shape or a trapezoidal shape, through one or both of the two upper corner regions may be cut away. In the case of a glass sheet having a roughly rectangular shape or a trapezoidal shape it is suitable that the central area 10a is a rectangular or square area with proviso that the length a of the longer side of the central area 10a falls in the range from 0.3 (30%) to 0.8 (80%) of the length A of the longest side of the glass sheet 10 and that the length b of the shorter side of the central region 10a falls in the range from 0.4 (40%) to 0.8 (80%) of the width B of the glass sheet. The limitation of the preliminary cooling to the central area 10a of such a shape and size is favorable because at the fracture of toughened glass sheets for automobile side or rear windows splines tend to appear almost exclusively in that area.

In the preliminary cooling the efficiently cooled stripe-like regions 20 may not be so regular as illustrated in FIG. 2. That is, the stripe-like regions may by somewhat curved, and/or each stripe 20 may not be uniform in width. Furthermore it is optional to efficiently cool another set of stripe-like regions which intersect the illustrated stripe-like regions 20.

Figure 3:
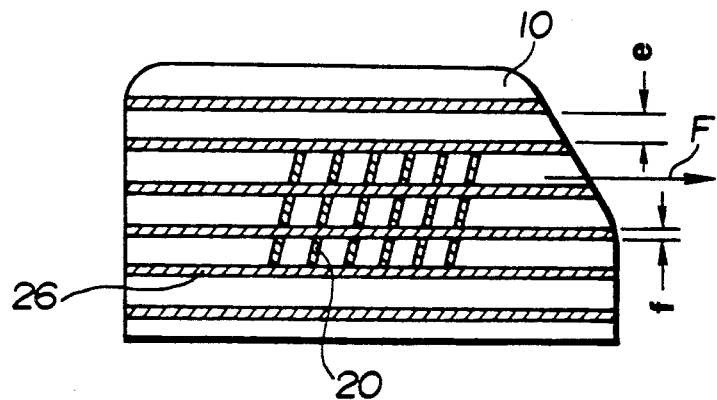
FIG. 3 is a plan view of a glass sheet toughened by a method according to the invention and explanatorily shows striped patterns of relatively highly toughened regions.

Referring to FIG. 3, when the preliminarily cooled glass sheet 10 is ultimately cooled in the station 18 it is almost inevitable that the glass sheet is relatively highly stressed and toughened in stripe-like regions 26, which are elongate in the direction of advance of the glass sheet, than in the remaining regions. Usually the distance e between two adjacent stripe-like elongate regions 26 is from about 5 mm to about 25 mm and the width f of each elongate region 26 is from about 3 mm to about 6 mm. As the effect of the preliminary cooling according to the invention the glass sheet 10 is relatively highly stressed and toughened also in the stripe-like regions 20 which intersect the elongate regions 26. The illustration in FIG. 3 is explanatory. Actually the stripe-like elongate regions 26 may not be so regular as illustrated, and the toughened glass sheet may have a different distribution of relatively highly toughened regions and lesser toughened regions besides the striped toughening patterns illustrated in FIG. 3.

When the horizontally advancing glass sheet 10 is toughened by cooling with air jets without performing the preliminary cooling according to the invention the principal stress in each of the elongate regions 26 is in the direction perpendicular to the direction of advance of the glass sheet. Therefore, when the toughened glass sheet is fractured the cracks in the elongate regions 26 are liable to run in the longitudinal direction of these regions 26 since the cracks tend to run perpendicular to the direction of the principal stress, whereby the fractured glass sheet will possibly contain splines. By the preliminary cooling according to the invention principal stresses in different directions are induced in the stripe-like regions 20 such that the stripe-like regions 20 intersect the stripe-like elongate regions 26 where relatively high stressing occurs by the ultimate cooling. Therefore, in each of the elongate regions 26 principal stresses in two different directions alternate. In other words, in each of the stripe-like elongate regions 26 the direction of the principal stress becomes discontinuous, and there occurs a change in the direction of the principal stress at each of the intersections of that region 26 and the stripe-like regions 20. Therefore, the growth of the cracks in the longitudinal direction of each elongate region 26 is interrupted so that the possibility of the appearance of splines in the fractured glass sheet greatly reduces.

The angle θ of the stripe-like regions 20 with the direction of advance of the glass sheet is made greater than 45° and not greater than 135° because if this angle is too shallow the direction of the principal stress in the stripe-like regions 20 does not distinctly differ from the direction of the principal stress in the stripe-like elongate regions 26.

EXAMPLES 1-4

In every example a rectangular glass sheet having a thickness of 3 mm, a length of 700 mm and a width of 400 mm was toughened while the glass sheet was laid on conveyor rollers and horizontally advanced at a speed of about 15 m/min. First the glass sheet was uniformly heated to a predetermined temperature, which was about 650° C. or about 660° C.

The heated glass sheet was preliminarily cooled in a central, rectangular area (10a in FIG. 2). The center of the cooled area was the center of the rectangular glass sheet. The relative lengths of the longer and shorter sides (a and b in FIG. 2) were as shown in Table 1. In Examples 1, 2 and 3 the preliminary cooling was carried out by directing cool air jets to each face of the glass sheet from parallel rows of nozzles. In Example 4 the preliminary cooling was made by using a press having platens formed with parallel projections in a striped pattern. The cooling nozzles or the projections on the press platens were arranged such that the central area 10a of the glass sheet was cooled at a relatively high rate in stripe-like regions (20 in FIG. 2) than in the remaining regions. The angle, θ, of the stripe-like regions 20 with the direction of the advance of the glass sheet was as shown in Table 1. In Examples 1-3 using air jets, the heat transfer coefficient on each face of the glass sheet was about 30 kcal/m²·h·°C. in the stripe-like regions 20 and smaller in the rest of the central area, and the preliminary cooling was carried out for about 1 sec. In Example 4 using the press, the heat transfer coefficient was about 60 kcal/m²·h·°C. in the stripe-like regions 20 and smaller in the rest of the central area, and the preliminary cooling was carried out for about 0.5 sec. In every example the distance (c in FIG. 2) between the strip-like regions was about 30 mm, and the width (d in FIG. 2) of each stripe-like region was about 7 mm.

After the preliminary cooling, ultimate cooling of the glass sheet, which was still hot and advancing horizontally, was immediately performed by directing cool air jets onto each face of the glass sheet from an array of nozzles arranged in a slightly staggered lattice pattern. In every example the heat transfer coefficient on each face of the glass sheet reached about 200 kcal/m²·h·°C., and the cooling was continued for about 12 sec. In the glass sheet toughened by the ultimate cooling there were relatively highly toughened regions (26 in FIG. 3) in the pattern of stripes parallel to the direction of the advance of the glass sheet, while relatively high toughning was also accomplished in the obliquely intersecting stripe-like regions 20 where the preliminary cooling was efficiently made. In every example the distance (e in FIG. 3) between the stripe-like elongate regions 26 was about 15 mm, and the width (f in FIG. 3) of each elongate region 26 was about 5 mm.

The glass sheets toughened in Examples 1-4 were subjected to a fragmentation test as described hereinafter.

COMPARATIVE EXAMPLES 1-4

In every case the dimensions of the glass sheet were the same as in Examples 1-4, and the glass sheet was first heated to about 650° C. or about 660° C. as shown in Table 1, and toughening of the glass sheet was carried out while the glass sheet was laid on conveyor rollers and horizontally advanced at a speed of about 15 m/min.

In Comparative Examples 1 and 2 the preliminary cooling according to the invention was omitted, and the heated glass sheet was immediately subjected to the ultimate cooling which was performed in the same manner as in the foregoing examples. In Comparative Example 3 the preliminary cooling (using air) in Examples 1-3 was modified only in the dimensions of the cooled central area 10a and the angle (θ) of the stripe-like regions 20. In Comparative Example 4 the preliminary cooling (using the press) in Example 4 was modified only in the dimensions of the cooled central area and the angel (θ) of the stripe-like regions 20. In both Comparative Examples 3 and 4 the ultimate cooling of the glass sheet was performed in the same manner as in Examples 1-4. The toughened glass sheets were subjected to the fragmentation test.

FRAGMENTATION TEST

The test procedure was generally in accordance with British Standard No. BS 5282. Fragmentation of the tested glass sheet was checked by counting the number of glass particles included in each of many arbitrarily traced 50 mm×50 mm square areas of the glass sheet and the total number of splines which are longer than 60 mm and in which the length-to-width ratio is greater than 4. However, fragmentation was not checked in a 20 mm wide band around the edge of the glass sheet and a circular area of 75 mm radius around the point of impact. The test results were as shown in Table 2.

Fragmentation tests according to the E.E.C. standard and Japanese Industrial Standard were also conducted, and nearly the same results were obtained.

TABLE 1

| | Preliminary Cooling | | | Cooled Area (relative to glass sheet in lengths) | |
|---|---|---|---|---|---|
| | Initial Temp. of Glass Sheet (°C.) | Cooling Means | Angle (θ) of Stripe-like Regions (degree) | longer side | shorter side |
| Example 1 | 650 | air jets | 50 | 0.4 | 0.5 |
| Example 2 | 660 | " | 70 | 0.4 | 0.5 |
| Example 3 | 650 | " | 50 | 0.6 | 0.6 |
| Example 4 | 660 | press | 80 | 0.5 | 0.5 |
| Comp. Ex. 1 | 650 | — | — | — | — |
| Comp. Ex. 2 | 660 | — | — | — | — |
| Comp. Ex. 3 | 650 | air jets | 30 | 0.4 | 0.3 |
| Comp. Ex. 4 | 660 | press | 5 | 0.2 | 0.2 |

TABLE 2

| | Fragmentation Test Results | | |
|---|---|---|---|
| | Particle Count (in 50-mm square) | | Number of Splines |
| | Max. | Min. | |
| Example 1 | 283 | 83 | 0 |
| Example 2 | 266 | 69 | 0 |
| Example 3 | 291 | 77 | 0 |
| Example 4 | 265 | 61 | 0 |
| Comp. Ex. 1 | 262 | 65 | 8 |
| Comp. Ex. 2 | 303 | 130 | 3 |
| Comp. Ex. 3 | 253 | 60 | 6 |
| Comp. Ex. 4 | 258 | 42 | 6 |

What is claimed is:

1. A method of toughening a glass sheet, comprising the steps of:
   (a) heating a glass sheet to a temperature above the strain point of the glass;
   (b) preliminarily cooling the heated glass sheet from at least one face of the glass sheet while advancing the glass sheet horizontally so as to cool the glass sheet at a relatively high rate in a plurality of substantially parallel stripe-like regions which make an angle greater than 45 degrees and not greater than 135 degrees with the direction of advance of the glass sheet than in other regions, the preliminary cooling being made such that on said at least one face the heat transfer coefficient becomes in the range from 10 to 80 kcal/$m^2$·h·°C. in said stripe-like regions; and
   (c) after step (b) quenching the heated glass sheet while the glass sheet is advancing horizontally by blowing cooling gas jets onto each face of the glass sheet from an array of nozzles such that on each face of the glass sheet the heat transfer coefficient reaches at least 150 kcal/$m^2$·h·°C.

2. A method according to claim 1, wherein the preliminary cooling in step (b) is performed by blowing cooling gas jets onto at least one face of the heated glass sheet.

3. A method according to claim 2, wherein the preliminary cooling in step (b) is made for a period of time ranging from about 0.2 sec to about 1 sec.

4. A method according to claim 1, wherein the preliminary cooling in step (b) is performed by bringing a cool solid member into contact with at least one face of the glass sheet.

5. A method according to claim 4, wherein the preliminary cooling in step (b) is made for a period of time ranging from about 0.5 sec to about 2 sec.

6. A method according to claim 1, wherein said stripe-like regions are at a distance in the range from about 20 mm to about 50 mm from each other and each have a width in the range from about 5 mm to about 10 mm.

7. A method according to claim 1, wherein the glass sheet is not thicker than 3.5 mm.

8. A method according to claim 1, wherein the preliminary cooling in step (b) is made only in a central area of the glass sheet, said central area being defined such that the geometrical center of the central area and the geometrical center of the glass sheet approximately coincide.

9. A method according to claim 1, wherein the glass sheet has a generally quadrilateral shape with two parallel sides, the preliminary cooling in step (b) being made only in a central area of the glass sheet, said central area being a rectangular area defined such that the geometrical center of the rectangular central area and the geometrical center of the glass sheet approximately coincide, said rectangular area having a length in the range from 30 to 80% of the length of the longest side of the glass sheet and a width in the range from 40 to 80% of the width of the glass sheet perpendicular to said longest side.

* * * * *